March 26, 1929.  L. W. CHADDERDON  1,706,481
SWIVEL SOCKET
Filed Jan. 24, 1928
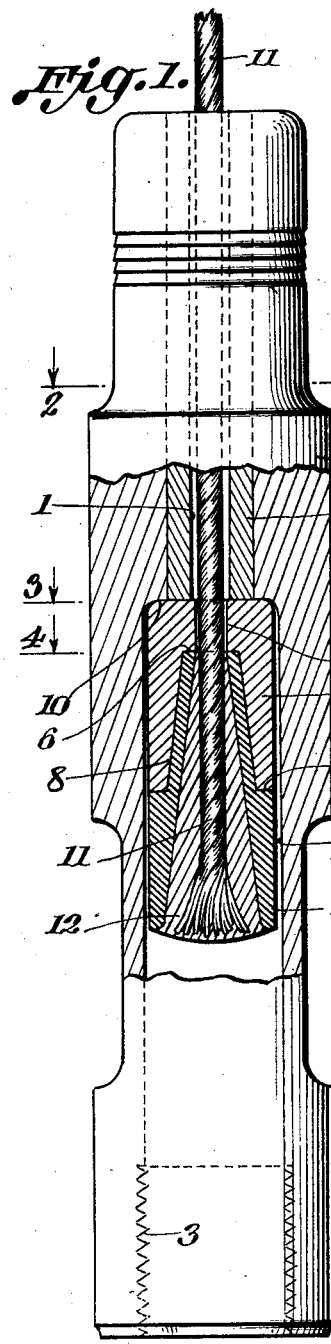
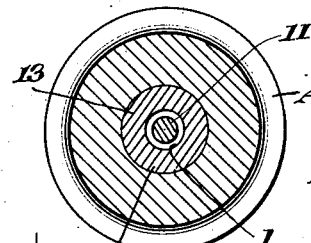
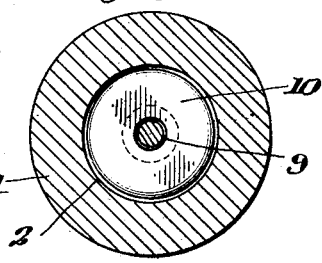
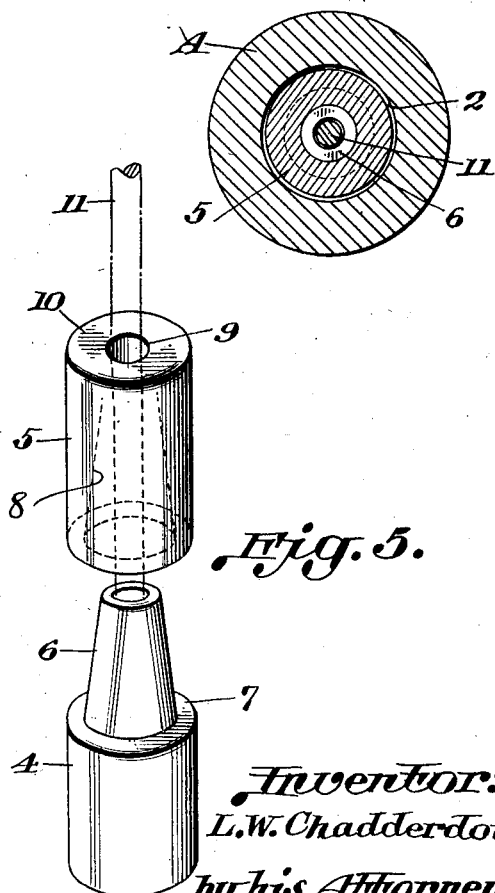
Inventor:
L. W. Chadderdon
by his Attorneys
Baldwin & Wight Patented Mar. 26, 1929.

1,706,481

UNITED STATES PATENT OFFICE.

LEWIS W. CHADDERDON, OF BRISTOW, OKLAHOMA.

SWIVEL SOCKET.

Application filed January 24, 1928. Serial No. 249,082.

The swivel socket shown herein is especially adapted for use in oil well drilling machinery or the like. In previous constructions, it has been common to make the swivel member in one piece and the wire rope has its end babbitted into this member. In using such tools, the constant turning movement causes the line to become worn at the top of the socket, and it is necessary to cut the line off at this point every two or three days. In such prior constructions, every time that the line is cut off, it is necessary to melt the babbitt, which is done by placing the swivel and a short piece of wire line in a forge or furnace. This of course heats the entire swivel and takes the hardening out of it. Such action frequently causes delay, because it is necessary to retemper the upper part of the swivel.

The present invention consists in making the swivel joint of two pieces, the upper of which is of hard tempered steel and fits into the socket member. The lower piece is made from soft steel and is fitted into the upper part with a tight fitting tapered joint. The wire rope is held in this lower part in the usual manner by the use of Babbitt metal. In such constructions, wherever it is necessary to cut the rope, the two parts of the swivel are separated and the lower or soft metal part can be placed in the forge for the purpose of removing the Babbitt metal and permitting the new end of the rope to be inserted and held therein by pouring fresh Babbitt metal around the same. This operation does not affect the other hard steel portion of the swivel, which remains ready for immediate use and will wear indefinitely.

Another feature of the invention consists in providing the upper part of the socket with a hard metal liner, the lower end of which will contact with the upper end of the hard metal portion of the swivel. It has been found impracticable to manufacture the whole socket from hardened steel, because this will break under the hard usage which the socket receives. The provision of this hard steel liner, particularly in combination with the two piece swivel socket, extends the length of life of both the socket and the swivel very greatly.

In the drawings:

Figure 1 is a side elevation of the socket with a central portion thereof and the swivel in vertical section.

Figure 2 is a horizontal section on the line 2—2 of Figure 1.

Figure 3 is a horizontal section on the line 3—3 of Figure 1.

Figure 4 is a horizontal section on the line 4—4 of Figure 1.

Figure 5 is a perspective view of the two portions of the swivel member separated.

The invention is illustrated as applied to the usual form of socket A, although it may be applied to various differing types of socket members. The upper part has a long bore 1, and the lower part has a bore 2 of much larger diameter. The lower end of the socket is threaded as shown at 3 for engagement with drilling tools in the usual manner.

The swivel is composed of two members 4 and 5, the lower member 4 being made of soft steel and comprising a portion the outside of which is cylindrical and fits within the tube 2. Integral with this is an upper portion 6 which tapers upwardly. The central passage through the member 4 is tapered throughout its length and is parallel to the taper of the upper portion 6 of this member. The cylindrical portions 4 and the tapered portion 6 are offset so as to form a shoulder 7. The upper portion 5 of the swivel is formed of hard or tempered steel and has extending partly therethrough a tapered bore 8 which fits over the tapered portion 6 of the lower member. The outer surface of the member 5 is cylindrical and of the same diameter as the cylindrical portion of the member 4. The lower end of the member 5 will rest upon the shoulder 7 and at this time the upper end of the member 6 will be at the upper end of the tapered bore in the member 5. The upper end of the member 5 is provided with a central cylindrical passageway 9 of diameter similar to that of the passage 1 in the socket, and the upper end of the member 5 is a plane surface which will contact with a similar surface on the socket member.

The wire rope 11 passes down through the passages 1 and 9, and into the lower member 4 of the swivel as shown in Figure 1, and is babbitted in place in the usual manner by pouring in Babbitt metal 12.

The upper portion of the socket member is provided with a central liner 13 of hard steel, the lower end of which is in position to contact with the upper end 10 of the hard steel member 5 of the swivel. It is obvious that this liner will prevent undue wear between the member 5 and the socket, and will also prevent the rope 11 from wearing the interior passage through the socket member.

As pointed out above, whenever the rope becomes worn, it will be cut off a short distance above the socket member and the swivel can be removed from said member. With the present construction the hard metal portion 5 of the swivel can be removed, while the soft metal portion 4 is placed in the forge for the purpose of melting the babbitt 12 and removing the cut off piece of rope. Thereafter, the member 5 may be passed up over the end of rope and the rope will be drawn down into the member 4, after which melted Babbitt metal will be poured in position to fasten the lower end of the rope to the member 4 of the swivel. The members 4 and 5 are then drawn up into the socket into the position shown in Figure 1. It is obvious that such operation in no way damages the member 5 or tends to remove the temper therefrom. The life of the swivel is therefore greatly increased, and, moreover, by the cooperation between the hard metal member 5 of the swivel and the hard metal liner 13 of the socket the life of the socket and swivel is further increased.

It is apparent that various changes can be made in the precise form and proportions of the parts without in any way departing from the spirit of the invention, which is to be regarded as limited only by the scope of the appended claims.

I claim as my invention:

1. A swivel socket comprising two members, an upper member of hard metal which is cylindrical in form and has a central passage extending therethrough, a portion of which is tapered, and a removable lower member of relatively soft metal and having an upper tapered part adapted to fit into said tapered passage in the upper member, and a lower cylindrical part, the juncture of said two parts forming a shoulder upon which the lower end of the upper member rests when the members are assembled, said lower member having a tapered passage therethrough in which the end of a wire rope is adapted to be held by babbitting.

2. In oil drilling machines, a socket of soft metal having a rope receiving central passage therethrough the upper portion of which is of less diameter than the lower, a hollow cylindrical hard metal liner fitting in the upper portion of said passage and having its lower end terminating at the beginning of the larger portion, in combination with a swivel formed of separable parts and located in the larger portion of the passage, the upper part of the swivel being of hard metal and contacting with the end of said liner, said upper part being provided with a centrally located rope receiving passage, and the lower part of the swivel being of soft metal and having a portion fitting into the upper part, the lower part having a tapered central passage in which the lower end of the wire rope is adapted to be retained by babbitting.

In testimony whereof, I have hereunto subscribed my name.

LEWIS W. CHADDERDON.